Oct. 10 1967 A. H. NICHOLLS 3,345,735
HONEYCOMB CORE CONSTRUCTION THROUGH THE
APPLICATION OF HEAT AND PRESSURE
Filed Feb. 25, 1963 3 Sheets-Sheet 3
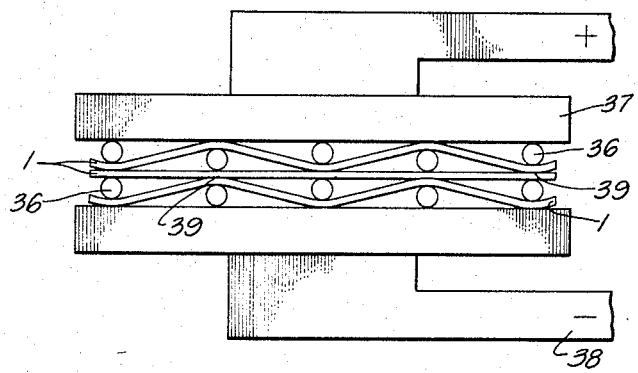
FIG. 12.
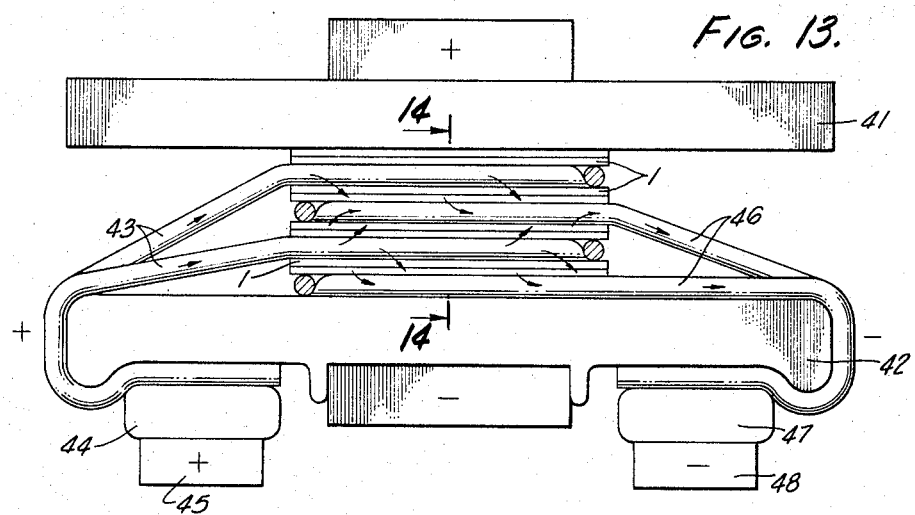
FIG. 13.
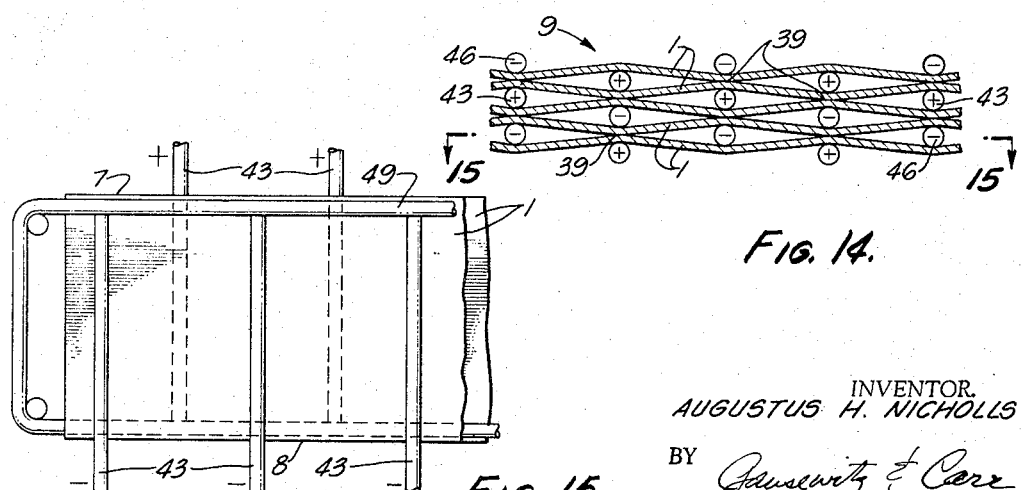
FIG. 14.
FIG. 15.
INVENTOR.
AUGUSTUS H. NICHOLLS
BY Jausewitz & Carr
ATTORNEYS

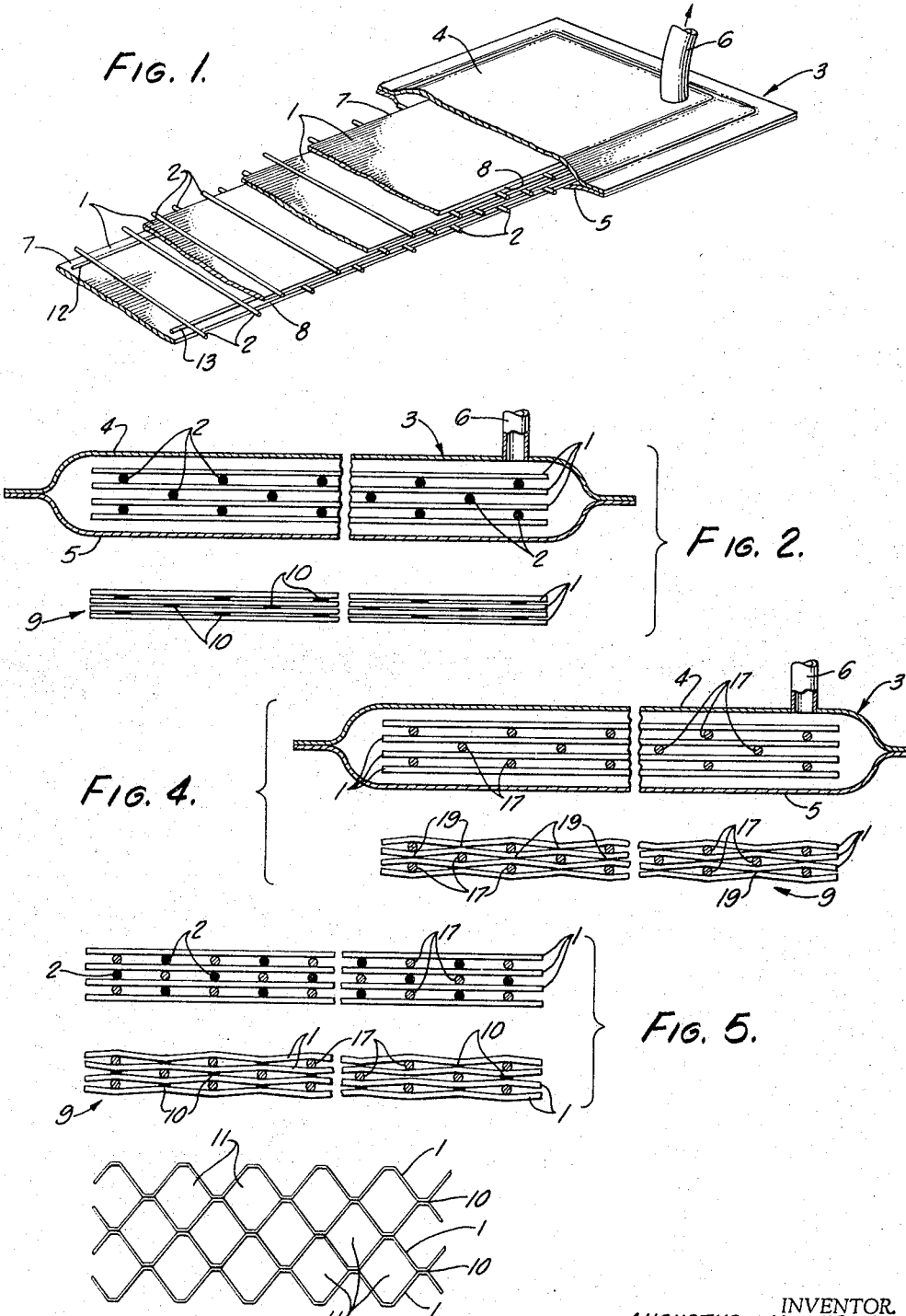

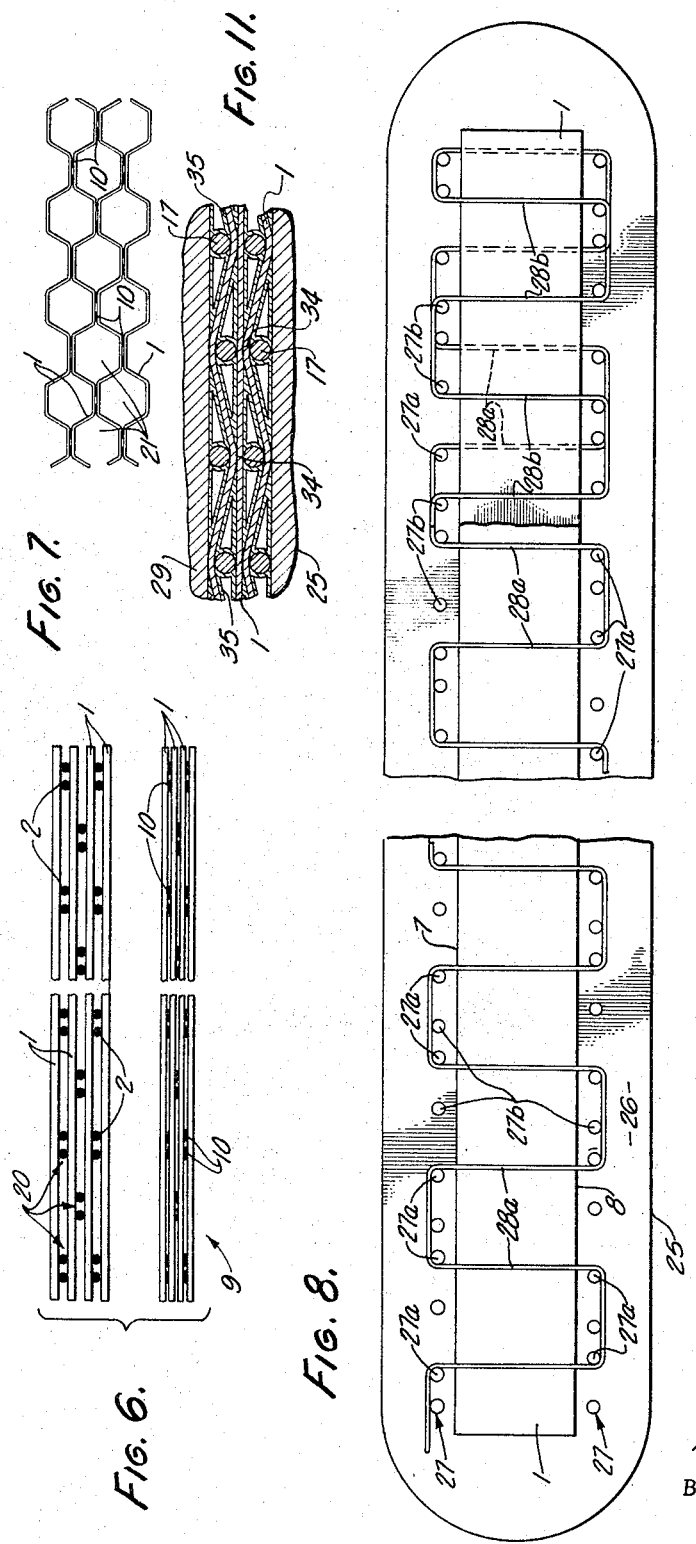

United States Patent Office 3,345,735
Patented Oct. 10, 1967

3,345,735
HONEYCOMB CORE CONSTRUCTION THROUGH
THE APPLICATION OF HEAT AND PRESSURE
Augustus H. Nicholls, 1170 Longfellow Drive,
Manhattan Beach, Calif. 90266
Filed Feb. 25, 1963, Ser. No. 260,799
9 Claims. (Cl. 29—470.9)

This invention pertains to the fabrication of a cellular unit of metal foil material, or of other thin stock.

At the present time, honeycomb material is used extensively in the construction of many different articles. One area of considerable volume is in the production of aircraft, missiles and space vehicles. There, sandwich-type assemblies are formed, with the honeycomb core material interposed between two facing sheets. Requirements for these units are extremely exacting. Resistance to extreme temperatures is often necessary, resulting in the use of a titanium, stainless steel and other materials that are even more difficult to form and secure together. Dimension tolerances are frequently quite close, and the honeycomb assembly normally must be fastened together with considerable strength. As a result of such factors, the construction of metal honeycomb core has become a tedious and costly operation. Elaborate welding equipment has been necessary for much honeycomb fabrication. Even so certain materials cannot be welded satisfactorily, and small cell sizes and certain foil thicknesses have been quite expensive to weld. The attachments of the foil strips making up the honeycomb core often do not provide the strength desired. Heretofore, it has been impossible to make a core that is completely fluid tight with a continuous bond along each node line.

The arrangement of this invention overcomes these and other disadvantages found with conventional techniques in the construction of honeycomb core. In the present method relatively narrow foil strips are stacked together, with spaced filaments interposed between the adjacent layers. These filaments may be of a bonding material so that upon subsequent application of heat and pressure the filaments adhere to adjacent foil surfaces and form an integral part of the honeycomb core produced. Alternatively, the filaments may be used only to concentrate forces in order that diffusion bonds are accomplished between the portions of the foil strips that are brought into contact when the unit is pressurized. In this event, the filaments are removed after the bonding of the core has taken place, not being a permanent portion of it. In some instances it is preferred to use a group of such filaments as pressure members in conjunction with an additional set of filaments that are joined to the strips as part of the bond.

This invention yields numerous advantages over the processes that have been employed in the past. It is much faster and less expensive, giving uniform results with very little scrappage. A stronger bond is accomplished and the core may be made entirely fluid tight. The use of forming with filaments and laminations is adaptable to almost any type of attachment that may be desired. This includes adhesive bonding as well as brazing or diffusion bonding. Also this technique can be followed in producing a superior type of resistance welded assembly.

The honeycomb core is produced in the unexpanded form, and may be made with almost any cell size, of different shapes and with any foil thickness. When the joints are formed by bonding or brazing, materials may be used that are not suitable for welding.

An object of this invention is to produce improved honeycomb core material at less expense and more rapidly than previously possible.

Another object of this invention is to provide honeycomb core with an improved bond of greater strength and uniformity so that a nonpermeable core may be achieved.

A further object of this invention is to provide a method of honeycomb core construction of great flexibility, which can be used with a wider variety of materials, and has the capability of producing different cell sizes and shapes.

These and other objects will become apparent from the following detailed description taken in connection with the accompanying drawing in which:

FIGURE 1 is a perspective view, partially broken away, of the foil strips, filaments and retort envelope used in constructing honeycomb core in accordance with this invention, FIGURE 2 is a side elevational view, partially in section, the upper part of the view showing the manner in which the foil and filaments are arranged, and the lower portion illustrating the resulting core unit obtained where the filaments constitute an integral part of the completed assembly, FIGURE 3 is a top plan view of the core of FIGURE 2 after expansion, FIGURE 4 is a view similar to FIGURE 2 of the arrangement where the filaments are removed after the foil strips are bonded together, FIGURE 5 is a side elevational view similar to FIGURES 2 and 4 where both bonding filaments and separator filaments are employed, FIGURE 6 is a side elevational view illustrating the arrangement of the filaments to secure a hexagonal cell shape, FIGURE 7 is a top plan view of the expanded core produced in accordance with the arrangement of FIGURE 6, FIGURE 8 is a top plan view of an arrangement in which the filament is applied as a continuous element, wound back and forth across the foil strips, FIGURE 9 is a transverse sectional view showing the wound filaments and assembled foil strips, with the top portion of the tool in place, FIGURE 10 is an elevational view of an arrangement wherein added spacer filaments are included, FIGURE 11 is an enlarged fragmentary sectional view of an arrangement in which an inert coating is used to limit the bonding area, FIGURE 12 is an end elevational view of an arrangement for forming honeycomb core by welding, FIGURE 13 is a side elevational view of a different arrangement for parallel welding, FIGURE 14 is a transverse sectional view taken along line 14—14 of FIGURE 13 illustrating the alignment of the filaments of opposite polarity, and FIGURE 15 is a sectional view taken along line 15—15 of FIGURE 14 showing how the welding filaments are arranged in the laminations and the manner in which an additional filament can be used to sever the ends of the welding filaments.

With reference to the drawing, the process of this invention in forming a brazed honeycomb assembly may be seen by reference to FIGS. 1 and 2. This involves superimposing layers of metal foil strips 1. These could be of almost any material, including those that are relatively difficult to work with, such as titanium, stainless steel, and various high temperature alloys. While the thickness of the foil strips 1 is exaggerated in the drawing for purposes of illustration, normally they will be quite thin so that a low density core may be produced. The foil material is readily available in the relatively narrow strips 1 and may be secured on rolls, cut to length when the lay up is made. Thus the length of the assembled foil strips 1 may be almost any desired value. This contrasts with the definite size limitations of sheets used in conventional fabrication processes.

Interposed between the layers 1 and extending transversely of the foil strips are spaced filaments 2. These are of brazing material with any of a variety of alloys being suitable. The filaments may be laid in loosely, or they may be suitably anchored on either side of the foil strips. Usually it is preferred to maintain the filaments under tension so that they are perfectly straight as they extend across the foil strips. These filaments normally are of small diameter, such as .003 inch. When honeycomb of substantially square cell shape is to be produced, the filaments 2 are arranged in an equally spaced parallel relationship. The filaments in alternate rows are positioned in vertical alignment, with those in the intervening rows being spaced equidistant therebetween.

When the foil and filaments have been assembled in this manner, they are positioned within a retort envelope 3. The latter element may be constructed of relatively thin foil-like sheets 4 and 5 that are slightly longer and wider than the stack of foil strips and filaments. Inconel that is .005 inch thick is suitable as the envelope material. The envelope 3 is completely sealed by being seam welded along its marginal edges. A tube 6 through the top sheet 4 provides ingress and egress to the interior of the envelope.

With the assembly of foil strips and filaments retained within the envelope 3 the interior is purged to assure removal of substantially all air from it. A hot purge at around 500° F. is preferred, filling the envelope with argon or other inert gas and exhausting the contents three times. After this, the retort envelope 3 is evacuated and tube 6 is closed. As a result, the pressure of the atmosphere squeezes the assembly of foil strips and filaments together as the sheets of the envelope are caused to converge.

The evacuated envelope 3 and its contents then are placed within a furnace. In a typical example the unit is maintained in the neighborhood of 1900° F. for around thirty minutes. This is to cause the brazing material of the filaments 1 to liquify. In other instances the temperature may raise the brazing material just to or slightly below its liquidus point. After the application of heat and pressure, the envelope is removed from the oven, opened, and the contents are removed and cooled. The portions of the filaments extending beyond the side edges 7 and 8 of the foil strips are trimmed off. The result is the unitary assembly 9 seen in the lower portion of FIG. 2. It will be found that the foil strips 1 are brazed together along lines 10 where the filaments 2 have been positioned. The melting of the filaments while the assembly is pressurized causes a bond to be effected along the line of each filament. The result is an unexpanded honeycomb core assembly that can be handled, machined, packaged, stored and inspected advantageously. Later, at the site of use if desired, it may be expanded to assume the position of FIG. 3. As such it defines a plurality of substantially square cells 11 as the foil strips are bent adjacent the connections along the lines 10.

The process of this invention may be utilized in forming a diffusion-bonded honeycomb core assembly as well as the brazed unit described above. The phenomenon of diffusion bonding is accomplished under heat and pressure but without the use of a brazing material or an actual melting of the substances bonded. It is believed that the bond is effected by the molecules of the materials penetrating adjacent surfaces under the influence of heat and pressure, where they remain and form an attachment upon cooling. Certain metals such as titanium are particularly conducive to the formation of attachments in this manner.

Instead of utilizing filaments 2 of brazing material these elements may be of a material that will effect a diffusion bond with the adjacent foil sheets 1. Thus, for example, if the members 1 are of titanium the filaments 2 likewise may be of titanium. For PH15–7Mo stainless steel, the filaments may be of the parent metal, titanium or Monel. Under heat and pressure these filaments will make a diffusion bond to both of the adjacent foil strips. The time and temperature values to accomplish this will depend upon the particular materials involved. With a Monel alloy a temperature of 1750° F. for sixty minutes is suitable. Thus this basic process can be followed either for brazing or for securing a superior diffusion bond.

The core produced by diffusion bonding in this manner is somewhat the same in appearance as the brazed unit. The filaments become an integral part of the completed unit, and upon expansion the cells will be bent at the nodes formed at the joints. In some instances it is desirable to apply a very thin coating on the foil strips 1 of a material to promote a diffusion bond. It may be applied by plating or spraying, and may be a substance similar to that used for the diffusion bonding filaments. In other cases the foil surfaces can be activated to facilitate the bonding. One means of accomplishing this is to place the sheets in a hydrogen atmosphere prior to the assembly with the filaments. A certain amount of the hydrogen will be absorbed into the surfaces and help promote the bond, but will be dissipated as the joint is formed.

This type of construction, whether brazed or diffusion bonded, offers considerable improvement over conventional procedures. Expensive and time-consuming welding is avoided. The honeycomb is produced in its unexpanded form greatly facilitating its handling prior to assembly in a completed item. A much stronger bond may be secured in this manner as the straight continuous filament joins the adjacent surfaces of the foil strips. Of course it is a simple matter with the use of the flexible retort envelope to produce the honeycomb in a nonoxidizing atmosphere under pressure. This gives a joint of maximum strength and uniformity at each filament. The joints may be made so that they have no interruptions, allowing a nonpermeable metal honeycomb unit to be produced, which could not be done in the past. By simply varying the spacing between the filaments 2, the size of the cells 11 may be controlled. The core may be constructed of almost any desired length, while there is equal flexibility in the number of foil strips that are stacked together. This means that the core may be made in sizes hitherto impractical or not possible. Another advantage lies in the fact that the foil in the relatively narrow strips 1 is obtainable in thicknesses where the tolerances have been held quite closely. The core, therefore, becomes more uniform than where larger sheets of foil must be employed. This also permits a savings of weight which is significant in aircraft and missile work. The extra material resulting from thickened portions of the foil, inherently found in larger sheets, is avoided.

In some instances it may be desirable to apply thin inert strips 12 and 13 adjacent and spaced inwardly from the side edges 7 and 8 of the foil strips 1. These may be filaments of a ceramic or other inert material that will coat both contacting foil surfaces with a substance which resists wetting and flow of brazing alloy. A glass fiber thread dusted with aluminum oxide may be used. The purpose of these strips is to provide a stop to prevent the brazing alloy from running into the nodes and the core interior when the honeycomb is being brazed to other materials. Frequently it occurs, when conventional techniques are followed and the facing sheets of the sandwich assembly are being brazed to the core, that the brazing alloy will tend to run up or down the nodes to fill up portions of the core interior. This condition, which sometimes is considered undesirable, is avoided when the stop off lines 12 and 13 are included. These thin filaments prevent the brazing material from flowing inwardly to the core interior.

In constructing a diffusion-bonded honeycomb assembly, it may be preferred to utilize inert filaments as pressure members rather than as elements that become a part of the completed unit. In this arrangement, the foil strips are assembled in layers as before with filaments 17 interposed between adjacent laminae (see FIG. 4). They may be spaced and positioned substantially as for the filaments 1. However, instead of being of brazing material, the filaments 17 are to be utilized as pressure elements and are not intended to become a permanent portion of the resulting core assembly. Hence, the filaments 17 are relatively inert, not being influenced by heat and pressures encountered, nor having an affinity for the material of the foil strips 1. These filaments may be of ceramic or glass fiber material. Metals such as columbium, tungsten and molybdenum also are suitable, while oxide-coated or ceramic-coated metals likewise can be used. While illustrated as round in cross section, the pressure filaments 17 may be of flat or specially shaped configuration to suit particular conditions. Generally they are of a thickness ranging from one to ten times that of the foil strips, or even larger.

The assembly of the foil strips 1, with the filaments 17 interposed between adjacent layers, again is placed within a retort envelope 3. As before, the unit is purged, the interior is evacuated, and the assembly is placed within an oven. A sufficient vacuum is drawn to assure that the foil strips 1 are bent to form contacting lines 19 between adjacent surfaces of the strips. It may be seen that the filaments 17 tend to force the foil strips together at these points and concentrate the forces at such locations. At the same time, they maintain the strips 1 in a spaced relationship in alternate layers so that there is no contact other than at the lines 19.

After being kept in the oven for a predetermined period the retort envelope 3 is removed from the heat, and again the foil strips are taken from the envelope and cooled. The heat and pressure cause the strips 1 to become bonded at locations 19 where the strips were forced together by the filaments 17. The filaments 17, being inert at the temperatures encountered, are unaffected by the heat and pressure within the retort and are not attached to the foil strips. These filaments are removed as the assembly is completed. The honeycomb core produced in this manner may be expanded as for the brazed assembly, producing a cellular unit substantially the same as that illustrated in FIG. 3.

A combination of the above techniques is employed in the arrangement seen in FIG. 5. Here, between the layers of the foil strips 1 there are provided filaments 2 of brazing material or of a material for diffusion bonding, as well as filaments 17 of inert material. The filaments 2 are spaced apart as for the arrangement of FIGS. 1 and 2, and the filaments 17 are spaced in a similar manner. These groups of the two kinds of filaments are arranged so that the inert filaments 17 are interposed between adjacent filaments 2 of brazing material, or of material for accomplishing a diffusion bond.

Upon subjecting the assembled sheets of foil and filaments of FIG. 5 to heat and pressure, a bond is effected where the filaments 2 of brazing or diffusion bonding material are located. The formation of this bond is assisted by the pressure concentrated at those areas by the adjacent filaments 17 of inert material. The inert filaments 17 also serve to maintain the sheets spaced at locations other than where the brazing material 2 is present to preclude any undesired diffusion bonding at such areas. This assures that the attachments will be formed only where required. Furthermore, there is less distortion necessary of the foil strips under pressure in order to effect the bond along the lines of the filaments 2 when the spacer filaments 17 are included. It is not necessary to bend the sheets to the point where they actually will engage each other because only the filaments 2 need be contacted. Hence, this combined technique offers some advantages over the arrangements described above. Of course the inert filaments 17 are removed as the honeycomb core is completed.

A variety of cell shapes may be obtained by following the teachings of this invention. In fact, by varying the filament spacing at different locations throughout the length of the foil strips, unequal sizes or shapes of cells can be formed in the same unit.

The cells may be made hexagonal if constructed in the manner illustrated in FIGS. 6 and 7. Relatively closely spaced parallel filament pairs 20 of brazing or diffusion bonding material, are placed at alternate locations throughout the assembly. These filament pairs 20 may be positioned generally as were the filaments 2 and 17 in the previously described embodiment. As a result, when placed under heat and pressure, bond will be formed at the location of both filaments in each pair. Therefore, instead of securing the foil strips together only at single locations for each joint, they are attached together at two relatively closely spaced points. As a result, upon expansion to the position of FIG. 7, hexagonal cells 21 are formed. The spacing between the adjacent filaments 20 and the adjacent pairs of these filaments normally are correlated so that the walls of the hexagonal cells are of the same width.

In mass production of honeycomb core in accordance with the teachings of this invention, it is advantageous to utilize a continuous filament which is wound back and forth across the foil strips for conveniently and accurately locating the transverse filament sections. A construction of this type may be seen by reference to FIGS. 8 and 9. Here there is a base member 25 having a flat elongated upper surface 26. Projecting vertically upward from this surface is a plurality of pins 27 arranged in a spaced relationship in two parallel rows. In use of this arrangement a foil strip may be placed on surface 26 intermediate the two rows of pins 27. The filament 2 or 17, which may be in the form of a continuous length of wire, then is wound around appropriate pins 27a so that it has equally spaced parallel segments 28a transversely crossing the foil strip.

In each instance as the wire is fed alongside the edge of the foil strip before being passed across it, one of the pins 27b is skipped. This intermediate pin is for use in winding over the next foil strip layer that later is superimposed on the first. As the wire is wound progressively around the pins 27a, skipping one pin 27b each time on the outside of the foil strip, as seen at the left in FIG. 8, the entire length of the foil strip becomes covered by the transversely extending segments 28a of the wire, as illustrated. When the end of the foil strip has been reached, a second strip then is laid across the first, also extending over the intermediate sections of the wire. Then the wire is again wound around the pins, moving this time to the left. However, the alternate pins 27b, which were skipped in the previous winding, now are engaged by the wire as it is returned the length of the base element 25. This positions the next set of transverse wire elements intermediate and equally spaced from the first. As a result, there is produced a pattern similar to that shown in FIGS. 1 and 2 by the winding procedure on the base 25.

When the wire has been advanced to the left end of the base, a third foil strip is positioned on top and the winding is repeated, engaging this time the first set of pins 27a. This procedure is followed over and over to assemble as many foil strips with intermediate sections of wire as desired. For adjacent layers the wire engages alternate pins so that the pattern is duplicated in every other layer throughout the assembly.

It should be noted that in accomplishing this type of lay up pattern, the spacing of the pins 27 is not equal. This allows the wire to be wrapped around the exterior of the pin so that the intermediate portion falls in the proper place in the lay up. It is necessary because the wire is wound on different sides of the pins as it progresses back and forth the length of the unit.

After the foil strips and wires have been assembled in the manner described above, a top piece 29 is placed over the base. The top piece 29 is the length of the base 25, and includes recesses 30 and 31 that can receive the upwardly projecting pins 27. It also has a flat lower surface 32 to engage the uppermost lamination of the metal foil strips. This assembly of the elements 25 and 29 provides a convenient means for applying appropriate pressure to the foil strips and filaments as the heat is applied to effect the bond of the foil sheets. By using upwardly projecting pins 27 it is a relatively simple matter to guide the filament around the pins to position it properly for the bonding operation. Precise positioning is maintained and the filament is applied rapidly. The pins also permit the filament to be drawn tightly so that there is no slack or bending in the intermediate portions. The winding with a continuous filament offers advantages regardless of whether or not pins as shown in FIGS. 8 and 9 are utilized. In some cases it may be preferred to use some other form of guiding arrangement for the filament. At other times the filament may be extended over the foil sheets without any mechanical guide being used. The continuous filament may circumscribe the base 25 rather than being passed back and forth only on the top surface of the tool.

In some instances when the honeycomb core is to be fabricated by diffusion bonding, there is a tendency for an unwanted attachment to be effected intermediate the pressure filaments. This condition may be alleviated by the arrangement illustrated in FIG. 10. Here there may be seen the inert pressure-exerting filaments 17 interposed between the foil layers 1 in the usual manner. Additionally, there are smaller filaments 33 between the foil layers and adjacent the pressure filament 17. These additional filaments act as spacers to prevent contact between the sheets 1 intermediate the areas where the bond is to be accomplished. Hence, they are of inert material and are of smaller diameter than the pressure-filaments 17. If the spacer filaments are made too large they can exert a force on adjacent sheets which would form a diffusion bond rather than separate the sheets as intended, or they can reduce the available pressure at the filaments 17. When the filaments 33 happen to be in vertical alignment the thickness of each normally should not exceed half of that of the filaments 17. There may be one or more filaments 33 in each space between the pressure element 17 and the area 34 where the diffusion bond takes place. The filaments 33 are not necessarily positioned in vertical alignment but are located to best function as spacer elements. These members need not be round in cross section, but may be flat strips or of other configuration.

In accomplishing diffusion bonding of the core the filaments 17 may be of oxide coated or plain steel wire. If such a substance is utilized it will tend to adhere to the foil sheets in constructing the core of a material such as stainless steel. It is still possible to use these steel wire filaments, however, if subsequent to the bonding operation the core is dipped into a nitric acid bath. This may be a solution of fifty percent nitric acid concentration with a chromic acid inhibitor if required. The acid bath will entirely remove the steel wire which will go into solution after a few minutes, yet the stainless steel core will not be attacked.

The arrangement of this invention is not limited to the fabrication of brazed or diffusion bonded metal foil honeycomb core. The use of a filament may also be employed in the construction of honeycomb material of aluminum, paper, glass fiber, or the like, where adhesive bonding normally is used for the attachment. When cores of such materials are to be constructed in accordance with this invention, the filament comprises, or is coated or impregnated with, a bonding material such as epoxy resin. For example, the filament for constructing glass fiber honeycomb core material may be a string or thread impregnated with epoxy resin. The filament is interposed between adjacent layers of the assembly similarly to the arrangement described above where the filaments 2 were to remain as a portion of the completed unit. The technique of applying the filament as a continuous element may be followed as before. The adhesive then may be subjected to heat and peessure to accomplish the bond at the node lines. Hence, it can be seen that the teachings of this invention are flexible and have wide applicability.

Another simple but effective means for precluding unwanted bonding intermediate the pressure filaments is illustrated in FIG. 11. This is based upon the coating of all the exposed surfaces with a removable inert compound. The foil sheets 1 and pressure filaments 17 are laid up appropriately as before, such as in the manner shown in FIG. 4. The assembly then is clamped together between elements 25 and 29 or other means to hold them in a fixed relationship. The damping force is sufficient to assure that the sheets 1 are brought into contact at the areas 34 where the bond is to take place. After this the inert material is applied to the surfaces of the sheets 1. This may be accomplished by dipping the assembly into a thin slurry of aluminum oxide in a liquid such as acrylic resin or alcohol. The result is a coating 35 on all exposed surfaces of the foil sheets. However, the liquid will not penetrate to the bond areas where the sheets 1 are forced together. After draining off excess liquid the assembly is baked dry. The bonding then is effected by heat and atmospheric pressure in the usual manner. The inert coating 35 prevents all extraneous bonding so that the attachments are effected only at the node lines where desired. Upon completion, the coating 35 is removed readily by blowing with air or other suitable means.

This procedure has the advantage of assured results with a minimum of complexity and expense. It avoids the use of large pressure filaments which can lead to excessive buckling of the sheets 1 when under vacuum conditions. All necessity for extra spacer filaments is eliminated.

While particularly useful for diffusion bonding, the use of an inert coating also can serve to prevent unwanted brazing alloy flow in the brazing process. This will preclude brazing outside the desired bond line. It also can prevent unwanted diffusion bonding that under some circumstances can occur during brazing.

The construction of honeycomb core from a lay-up of superimposed sheets together with the use of filaments positioned between adjacent sheets is adaptable for welded assemblies as well as those formed by brazing or bonding. In the welding process the filaments separate alternate pairs of layers, and apply pressure to the joint lines at the cell nodes. A resistance weld is effected along the length of each foil-to-foil contact line.

One arrangement for welding the core together is illustrated in FIGURE 12. Here the sheets 1 are stacked together with filaments 36 being positioned between adjacent sheets similar to the manner of FIGURES 1, 2 and 4 where the elements 2 or 17 were used. In this instance, however, the filaments 36 are of copper or other appropriately electrically conductive material. The filaments 36 are trimmed to be flush with the edges of the sheets.

The assembled sheets and filaments are interposed between cauls 37 and 38 which likewise are of electrically conductive material such as copper. Enough clamping pressure is applied by the cauls to assure a good contact at the locations of the filaments 36. With one of the cauls positive and the other negative, welding current then is passed through lay-up from one side to the other. This may be accomplished within the jaws of any appropriate spot welding machine. The result is that at the locations between the filaments welds are produced. Then upon release from the jaws the unit is expanded in the usual manner with a strong weld being located at each node line between overlying and underlying filaments 36. If required the filaments may be removed by cutting and shaking, blowing, or by pulling out the filaments as the core is expanded. Also the filaments may be removed chemically.

Copper filaments can be dissolved in a solution of 50% nitric acid and water, plus one ounce of chromic acid per gallon of solution.

The filaments in this or the other embodiments of the invention may be unitary elements, or composed of strands. The strands may be laid straight, twisted or woven. Stranded filaments flatten out under pressure which can increase the electrical contact area and lessen any tendency for the filaments to shift sideways under pressure. They also are more flexible which is advantageous in creating an assembly by winding.

This welding arrangement has the advantage of great simplicity, requiring no elaborate equipment or techniques in accomplishing the welds. No particular care is necessary in handling the filaments and the sheets of the lay-up, with exception that some caution should be exercised in assuring that shunting does not occur from filament to filament at the edges of the pack. However, with this welding process the voltages must be somewhat higher than usually necessitated for welding operations. The applied voltage must equal the sum of the voltage drops across each node line of the weld combination. Power requirements become relatively large. This may be alleviated to some extent by progressively welding sections of a core assembly, rather than operating on all portions of it at once.

A similar process may be followed in welding with nonconductive filaments. Here the filaments 36 instead of being of copper are of some nonconductor such as glass fiber, ceramic or the like. The welding current then flows entirely through the sheet members, following a zigzag pattern from one caul to the other. The welds are effected at the contacting lines 39 where the sheets are forced into contact by the filaments. Other portions of the sheets 1 will be maintained spaced from each other by the filaments.

Again, the welding technique offers considerable simplicity in completing the honeycomb core unit. However, here the applied voltage and the power requirement are even higher than when conductive filaments are used. This is because the applied voltage must now include the voltage drops due to the current flowing through the longitudinal portions of the sheets 1, rather than merely the portions in between the filaments. Also, there will be a certain amount of heating of all portions of the sheets 1 in view of the current passing through them. In some instances this may be detrimental to the resulting properties of the sheets 1.

Parallel welding with conductive filaments also may be resorted to, having the advantage of reducing the voltage and power requirements considerably over those for the previously described welding arrangements. As shown in FIGURES 13, 14 and 15 the assembled sheets and filaments are interposed between nonconductive plates 41 and 42. Phenolic resin may be utilized as the material for these elements. On the left-hand side of the assembly as illustrated in FIGURE 13 there extends a plurality of conductive filaments 43. These may be strands of copper wire as in the previously described embodiment. The filaments 43 extend to the lower side of the phenolic plate 42 where they connect to copper braid 44 that is in turn engaged by a copper bar 45. The latter element connects to the positive terminal of a conventional spot welding machine.

On the opposite side of the assembled sheets are filaments 46 which likewise are of electrically conductive material and may be identical to the filaments 43. The filaments 46 extend to copper braid 47 which is contacted by a copper bar 48. The negative electrode of the spot welding machine connects to bar 48. As a result, in each vertical row where the nodes are to be welded, the filaments alternate in polarity (see FIGURE 14).

The filaments 43 and 46 extend from their electrode connections only to the opposite side of the stack of sheets. In other words, filaments 43 do not extend beyond the right-hand edge of the assembly because interference with the other filaments 46 of opposite polarity must be avoided. Similar considerations hold true for the positioning of filaments 46 with respect to the left-hand edge. It is possible to appropriately dimension the filaments 43 and 46 so that they do not pass beyond the outer edges of the sheets. However, where the filaments are wound between the sheets as the lay-up is made, as may be desirable in the mass production of honeycomb core, additional filaments 49 may be used to sever the copper wires 43 and 46. The elements 49, which may be of relatively hard material such as music wire, extend perpendicular to the filaments 43 and 46 and are close to the longitudinal edges of the sheets 1. Thus, there will be a filament 49 for each row of filaments 43 and for each row of filaments 46. If desired, the filament 49 may comprise a continuous element wound back and forth as best seen in FIGURE 15. Then when the assembly is placed between the blocks 41 and 42 and a compressive force is exerted, the filaments 49 will sever or virtually sever the filaments 43 and 46 so that they do not extend too far.

In effecting the weld the current flows from terminal 45 to terminal 48 through the filaments 43 the contacting portions of the sheets 1, and into the filaments 46. This arrangement, therefore, has voltage requirements no greater than those for any standard single spot welding operation. Furthermore, the filaments may be grouped as desired and attached to multiple electrodes for separate spot welding operations. In this manner the current requirements can be reduced to any desired level. On the other hand, this procedure is slightly more complex than the other welding arrangements necessitating that the filaments be insulated from each other externally of the stack of sheets 1. In winding the filaments across the sheets 1 a more intricate procedure becomes necessary because external electrodes must be contacted, and because the positive and negative filaments must be alternated in each vertical row of nodes in the lay-up.

All three of the welding techniques described above offer the advantage of relative simplicity, yet they produce welded honeycomb core of superior strength and uniformity.

The foregoing detailed description is to be clearly understood as given by way of illustration and example only, the spirit and scope of this invention being limited solely by the appended claims.

I claim:
1. In the method of producing honeycomb core material the steps of
preparing a flexible sealed envelope,
assembling a plurality of metal foil sheets in superimposed layers,
interposing a plurality of filaments between said layers to provide spaced rows of filaments in a generally columnar relationship through said superimposed layers,
positioning said sheets and filaments within said envelope,
then maintaining said envelope at an interior pressure below ambient atmospheric pressure so that atmospheric pressure is applied to said sheets and filaments through said envelope and causes said sheets to become deformed around said filaments so that spaced areas of adjacent sheets are brought into interengagement,
and subjecting said envelope and its contents while so maintained below ambient pressure to an elevated temperature for a predetermined period of time,
and then cooling and removing said sheets and filaments from said envelope.

2. The method in accordance with claim 1 in which said filaments include members of substantially inert material.

3. In the method of fabricating honeycomb core material the steps of assembling in a superimposed relationship a plurality of metal foil laminations of a material capable of diffusion bonding under predetermined heat and pressure, interposing between adjacent laminations a plurality of spaced filaments of relatively inert material, at least some of said filaments being in vertical alignment betwen alternate adjacent laminations, compressing said laminations so as to deform said laminations around said filaments and press said laminations together at the locations between said vertically aligned filaments, then applying an inert coating to remaining exposed areas of said laminations, then introducing said laminations and filaments into a flexible envelope, then reducing the pressure in said envelope to below atmospheric pressure and simultaneously raising the temperature of said laminations and filaments so as to apply said predetermined heat and pressure thereto, then removing said laminations and filaments from said envelope, and then removing said filaments and inert coating from said laminations.

4. In the method of fabricating honeycomb core material, the steps of assembling in a superimposed relationship a quantity of metal foil laminations, interposing betwen adjacent laminations a plurality of spaced filament of relatively inert material with at least some of said filaments being arranged generally in columnar relationship through said superimposed laminations, said filaments being integrally attached together to define a continuous element, said continuous element being extended repeatedly across said laminations to define said spaced filaments, then subjecting the assembled laminations and filaments simultaneously to heat and to a compressive force exerted from opposite sides so that said laminations are deformed over said filaments and said filaments act as pressure-concentrating elements forcing adjacent portions of said laminations together when said assembly is subjected to said compressive force for effecting diffusion bonding at said adjacent portions, and then cooling said assembly and removing the force therefrom.

5. In the method of fabricating honeycomb core material the steps of laying up in a superimposed relationship a quantity of metal foil strips, interposing betwen adjacent layers of said strips a plurality of spaced parallel filaments so that at least some of said filaments provide spaced rows in generally columnar alignment through said superimposed metal foil strips, placing said assembled foil strips and filaments within a flexible sealed envelope having substantially no oxygen therein to provide a nonoxidizing atmosphere, and then subjecting said assembled foil strips and filaments to heat and pressure while in said nonoxidizing atmosphere by evacuating said envelope tc cause atmospheric pressure to force said assembly together, so as to deform said metal foil strips over said filaments and bring portions of adjacent strips into interengagement for effecting a bond at spaced locations between adjacent foil strips.

6. In the method of fabricating honeycomb core material the steps of laying up in a superimposed relationship a quantity of metal foil strips, positioning pins adjacent opposite edges of said strips, interposing between adjacent layers of said strips a plurality of spaced parallel filaments so that at least some of said filaments provide spaced rows in generally columnar alignment through said superimposed metal foil strips, said filaments being attached together in a continuous length, and wound about said pins and across said foil strips to provide said spaced parallel filaments, placing said assembled foil strips and filaments within a nonoxidizing atmosphere, and then subjecting said assembled foil strips and filaments to heat and pressure while in said nonoxidizing atmosphere, so as to deform said metal foil strips over said filaments and bring portions of adjacent strips into interengagement for effecting a bond at spaced locations betwen adjacent foil strips.

7. The method of constructing honeycomb core material comprising the steps of assembling in layers a plurality of sheets of metal foil of a material capable of diffusion bonding when subjected to pressure at a predetermined temperature, interposing between adjacent sheets a plurality of spaced filaments relatively inert at said temperature with at least some of said filaments arranged generally in a columnar relationship through said layers, inserting said assembled sheets and filaments between additional sheets of flexible metal foil, attaching said additional sheets together to form a sealed envelope receiving said assembled sheets and filaments, removing substantially all oxygen from within said envelope, then providing said envelope with an interior pressure below ambient atmospheric pressure for subjecting said sheets to pressure sufficient to deform portions of said sheets intermediate said filaments so that adjacent intermediate surfaces are brought into contact with each other, subjecting said sheets to said predetermined temperature while so deformed, then cooling said sheets, and then removing said filaments therefrom.

8. In a method of fabricating honeycomb core material the steps of assembling in a superimposed relationship a plurality of metal foil laminations of a material capable of diffusion bonding under predetermined heat and pressure, interposing between adjacent laminations a plurality of spaced filaments of relatively inert material, at least some of said filaments being in vertical alignment betwen alternate adjacent laminations, compressing said laminations so as to deform said laminations around said filaments and press said laminations together at the locations betwen said vertically aligned filaments, then dipping said laminations in a slurry containing inert material, then removing said laminations from said slurry to leave a coating of inert material on remaining exposed areas of said laminations, then introducing said laminations and filaments into a flexible envelope, then reducing the pressure in said envelope to below atmospheric pressure and simultaneously raising the temperature of said laminations and filaments so as to apply said predetermined heat and pressure thereto for effecting a bond at said locations where said laminations are pressed together, then removing said laminations and filaments from said envelope, and then removing said filaments and inert coating from said laminations.

9. The method as recited in claim 8 in which said slurry is composed of aluminum oxide in a liquid.

References Cited

UNITED STATES PATENTS

| | | | |
|---|---|---|---|
| 1,733,455 | 10/1929 | Ferrand | 29—421 |
| 2,212,481 | 8/1940 | Sendzimir | 29—455 |
| 2,284,773 | 6/1942 | Sivian et al. | 29—493 |
| 2,551,244 | 5/1951 | Clark et al. | 29—493 |
| 2,799,318 | 7/1957 | Blucher et al. | 29—421 |
| 2,816,355 | 12/1957 | Herman | 29—471.1 |
| 2,882,588 | 4/1959 | Riepper et al. | 29—421 |
| 2,999,306 | 9/1961 | Baxter | 29—455 |
| 3,016,450 | 1/1962 | Keeleric | 29—471.1 |
| 3,044,160 | 7/1962 | Jaffe | 29—455 |
| 3,074,839 | 1/1963 | May et al. | 29—455 |
| 3,200,489 | 8/1965 | Keeleric | 29—470.9 |
| 3,206,847 | 9/1965 | Keeleric | 29—471.1 |

FOREIGN PATENTS 905,386  9/1962  Great Britian.

JOHN F. CAMPBELL, *Primary Examiner.*

P. M. COHEN, *Assistant Examiner*